(12) United States Patent
Bleidorn et al.

(10) Patent No.: US 11,240,098 B2
(45) Date of Patent: Feb. 1, 2022

(54) AUTOMATIC LOCAL GATEWAY ROUTER BACKUP OF A NETWORK GATEWAY ROUTER

(71) Applicant: Charter Communications Operating, LLC, St. Louis, MO (US)

(72) Inventors: Tim Bleidorn, Colorado Springs, CO (US); Cheryl Warne, Lone Tree, CO (US); Shane Newberg, Aurora, CO (US); Christopher Teague, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/839,998

(22) Filed: Apr. 3, 2020

(65) Prior Publication Data
US 2021/0314217 A1 Oct. 7, 2021

(51) Int. Cl.
*H04L 12/24* (2006.01)
*H04L 29/12* (2006.01)
*H04L 12/66* (2006.01)

(52) U.S. Cl.
CPC .......... *H04L 41/0668* (2013.01); *H04L 12/66* (2013.01); *H04L 61/2015* (2013.01)

(58) Field of Classification Search
CPC .. H04L 41/0668; H04L 12/66; H04L 61/2015
USPC ...................................................... 709/223
See application file for complete search history.

(56) References Cited

U.S. PATENT DOCUMENTS

| | | | | |
|---|---|---|---|---|
| 7,283,465 B2* | 10/2007 | Zelig | ................... | H04L 12/4641 370/217 |
| 7,936,756 B2* | 5/2011 | Liu | ......................... | H04L 45/00 370/392 |
| 7,990,852 B1* | 8/2011 | Cirkovic | ................. | H04L 45/00 370/228 |
| 8,547,844 B2* | 10/2013 | Nadas | ..................... | H04L 45/28 370/235 |
| 9,590,844 B1* | 3/2017 | Esale | .................. | H04L 41/0668 |
| 9,723,642 B2* | 8/2017 | Mhatre | ................. | H04W 76/22 |
| 10,027,589 B1* | 7/2018 | Singh | .................... | H04L 61/103 |
| 10,148,349 B2* | 12/2018 | Chiu | .................. | H04Q 11/0066 |
| 10,182,003 B2* | 1/2019 | Ramachandran | ....... | H04L 45/50 |
| 10,630,536 B2* | 4/2020 | Bhagvath | ............ | H04L 61/2007 |
| 2003/0037165 A1* | 2/2003 | Shinomiya | .............. | H04L 29/06 709/238 |
| 2003/0200441 A1* | 10/2003 | Jeffries | ............... | H04L 63/1458 713/181 |

(Continued)

*Primary Examiner* — David P Zarka
(74) *Attorney, Agent, or Firm* — Withrow & Terranova, PLLC

(57) ABSTRACT

Automatic local gateway router backup of a network gateway router is disclosed. A local gateway router communicatively coupled to a local subnet determines that a network gateway router that serves as a default gateway router for the local subnet has stopped responding. The local gateway router and the network gateway router are configured to communicate with one another via a tunnel implemented by a tunneling protocol. In response to determining that the network gateway router has stopped responding, automatically switching, by the local gateway router, from a tunneling mode to a routing mode, such that the local gateway router becomes the default gateway router for the local subnet.

16 Claims, 5 Drawing Sheets

(56) References Cited

U.S. PATENT DOCUMENTS

| | | | | |
|---|---|---|---|---|
| 2003/0233473 A1* | 12/2003 | Bonhomme | ............ | H04L 45/00 |
| | | | | 709/238 |
| 2005/0111352 A1* | 5/2005 | Ho | ........................ | H04L 45/586 |
| | | | | 370/219 |
| 2007/0183417 A1* | 8/2007 | Maleport | ................ | H04L 45/00 |
| | | | | 370/389 |
| 2014/0293871 A1* | 10/2014 | Jung | .................... | H04W 40/20 |
| | | | | 370/328 |
| 2016/0080249 A1* | 3/2016 | Lu | .......................... | H04L 45/28 |
| | | | | 370/219 |
| 2019/0238440 A1* | 8/2019 | Theogaraj | .......... | G06Q 30/0241 |

* cited by examiner

AUTOMATIC LOCAL GATEWAY ROUTER BACKUP OF A NETWORK GATEWAY ROUTER

BACKGROUND

Service providers are increasingly interested in offering services to subscribers that were traditionally handled on the subscriber network rather than in the service provider's network. Such capabilities offer advantages to both the service provider and the customer.

SUMMARY

The embodiments disclosed herein implement automatic local gateway router backup of a network gateway router. In particular, a local gateway router operates in one of two modes, a tunneling mode and a routing mode. When a network gateway router is able to communicate with the local gateway router and provide default gateway router services, the local gateway router operates in the tunneling mode and communicates packets between the network gateway router and computing devices (e.g., hosts or host computers) on the subnet in a manner that is transparent to the computing devices on the subnet. If the network gateway router stops responding, the local gateway router transitions from tunneling mode to the routing mode, and becomes the default gateway router for the local subnet.

In one embodiment a method is provided. The method includes determining, by a local gateway router communicatively coupled to a local subnet, that a network gateway router that serves as a default gateway router for the local subnet has stopped responding. The local gateway router and the network gateway router are configured to communicate with one another via a tunnel implemented by a tunneling protocol. The method further includes, in response to determining that the network gateway router has stopped responding, automatically switching, by the local gateway router, from a tunneling mode to a routing mode, such that the local gateway router becomes the default gateway router for the local subnet.

In another embodiment a gateway router is provided. The gateway router includes a memory, a transceiver configured to be coupled to a local subnet, and a processor device coupled to the memory. The processor device is configured to determine that a network gateway router that serves as a default gateway router for the local subnet has stopped responding, a local gateway router and the network gateway router are configured to communicate with one another via a tunnel implemented by a tunneling protocol. The processor device is further configured to, in response to determining that the network gateway router has stopped responding, automatically switch from a tunneling mode to a routing mode, such that the gateway router becomes the default gateway router for the local subnet.

In another embodiment a computer program product is provided. The computer program product is stored on a non-transitory computer-readable storage medium and includes instructions configured to cause a processor device of a local gateway router to determine that a network gateway router that serves as a default gateway router for a local subnet has stopped responding, the local gateway router and the network gateway router configured to communicate with one another via a tunnel implemented by a tunneling protocol. The instructions are further configured to cause the processor device to, in response to determining that the network gateway router has stopped responding, automatically switch from a tunneling mode to a routing mode, such that the gateway router becomes the default gateway router for the local subnet.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
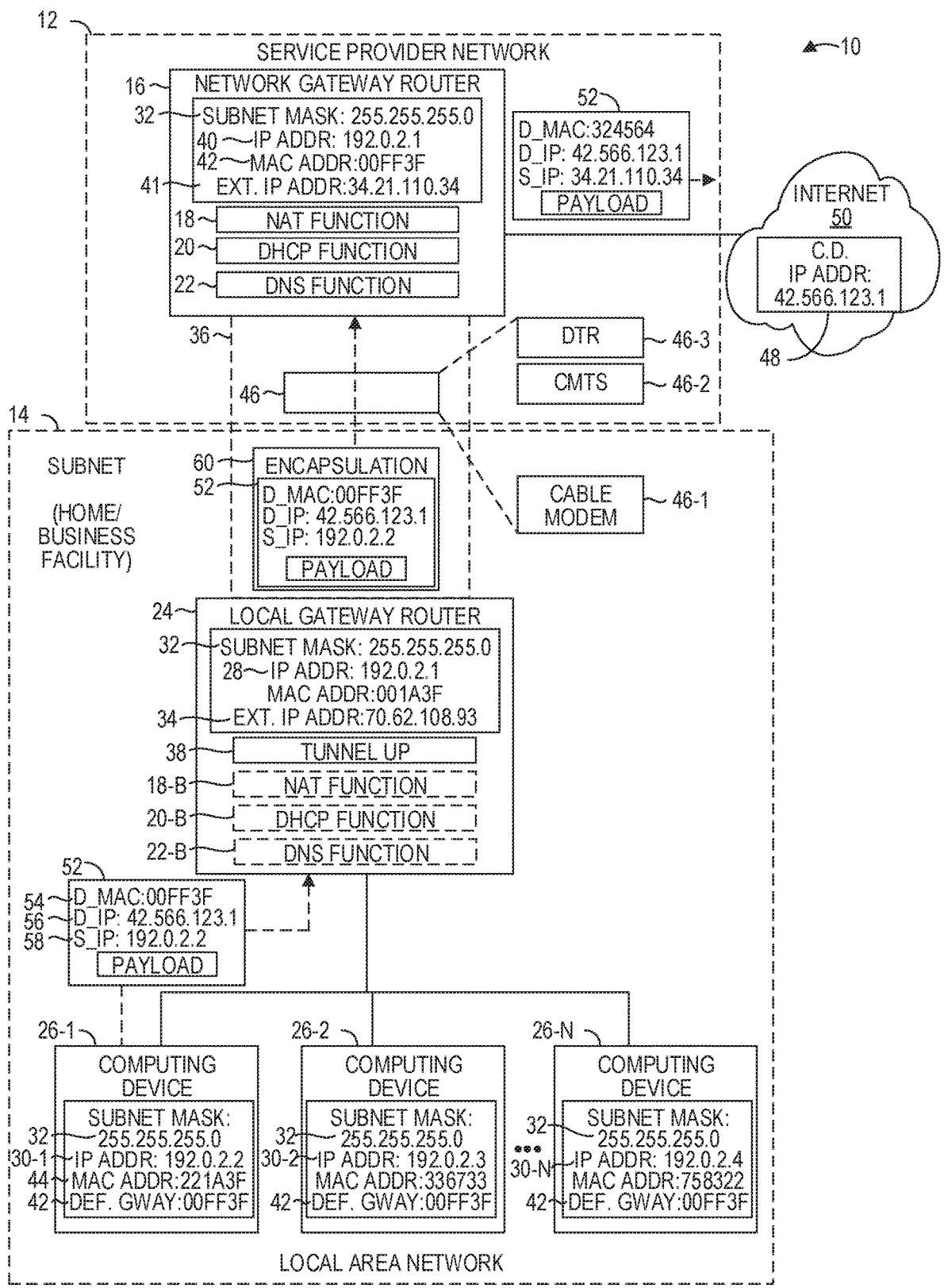
FIG. 1 is a block diagram of a system for facilitating local gateway router backup of a network gateway router according to some embodiments.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Service providers are increasingly interested in offering services to subscribers via the service provider's network that were traditionally handled on the subscriber network rather than in the service provider's network. Such capabilities offer advantages to both the service provider and the customer. For example, implementing capabilities offered by complex data processing equipment, such as a gateway router, in a service provider's network can reduce the amount of specialized knowledge that might otherwise be needed by a subscriber to configure, maintain, and modify a local area network. Implementing such services in the service provider network can also reduce time-consuming and costly support calls from customers who need help troubleshooting problems. Such services may also be an additional revenue source for a service provider.

One of the functions that might be offered by a service provider is that of a default gateway router that allows the computing devices on a subscriber network to communicate with computing devices that are on other networks, such as on the Internet. A default gateway router often provides multiple services, such as dynamic host configuration protocol (DHCP) services for providing network-connected computing devices with internet protocol (IP) addresses as needed, network address translation (NAT) services to translate private IP addresses associated with a subnetwork to a public IP address, Domain Name System (DNS) services for translating a domain name to an IP address, and the like.

The terms subnetwork, or subnet, will be treated synonymously herein, and refer to a data communications network, often but not necessarily an Ethernet network, wherein each connected computing device on the subnet has an IP address that has the same network address, and which utilizes the same subnet mask to determine whether other computing devices are on the same network or are on a different network. Such computing devices may be referred to herein as being "on" the same subnet. Computing devices on the same subnet can communicate with one another, typically via layer 2 addressing, such as a media access control (MAC) address, without the need for a router.

Typically, a subscriber network will have a local gateway router even when a service provider offers gateway routing services via a network gateway router. The term "network gateway router" refers to gateway routing functionality, such as NAT, DHCP, DNS and the like, implemented on a computing device operated by the service provider in a facility controlled by the service provider rather than the subscriber. In such situations, the local gateway router may be put into a tunneling mode, wherein the local gateway router establishes a tunnel with the network gateway router, and simply serves as a conduit for communications between local computing devices and the network gateway router. The local gateway router may establish a layer 2 tunnel with the network gateway router, essentially enlarging the subnet to include the network gateway router.

In practice, communications between a local gateway router and a network gateway router travel through one or more different computing devices, such as, by way of non-limiting example: a coaxial or fiber modem; an aggregation device such as a cable modem termination system, a fiber aggregation node, or the like; and a distribution router. In operation, the service provider computing device on which the network gateway router is implemented can fault, or a link can fault, rendering the network gateway router incapable of responding to the local gateway router and thus unable to provide gateway routing services.

The embodiments disclosed herein implement automatic local gateway router backup of a network gateway router. In particular, a local gateway router operates in one of two modes: a tunneling mode and a routing mode. When a network gateway router is able to communicate with the local gateway router and provide default gateway router services, the local gateway router operates in the tunneling mode and communicates packets between the network gateway router and computing devices (e.g., hosts or host computers) on the subnet in a manner that is transparent to the computing devices on the subnet. If the network gateway router stops responding, the local gateway router transitions from the tunneling mode to the routing mode, and becomes the default gateway router for the subnet.

FIG. 1 is a system for facilitating local gateway router backup of a network gateway router according to some embodiments. The system 10 includes a service provider network 12 and a local network, referred to herein as a local subnetwork (subnet) 14, located in a business or home. The service provider network 12 includes a network gateway router 16 that is configured to provide, for the local subnet 14, default gateway router functions, such as, by way of non-limiting example, one or more of a NAT function 18, a DHCP function 20 and a DNS function 22. The network gateway router 16 is physically located in a facility controlled by the respective service provider, and may be located tens, hundreds, or thousands of miles from the local subnet 14. The network gateway router 16 may be a special purpose routing device, or may be implemented via gateway routing functions executing on a conventional computing device.

The local subnet 14 includes a multi-modal local gateway router 24 that can operate in a tunneling mode or a router mode, both of which will be described in greater detail below. The local gateway router 24 is communicatively coupled to a plurality of computing devices 26-1-26-N via one or more networking technologies, such as Ethernet, Wi-Fi®, or the like. The local gateway router 24 and the plurality of computing devices 26-1-26-N are all on the same subnet, and thus each have an IP address 28, 30-1-30-N, respectively, that identifies a same network address, in particular, that of the local subnet 14, and which utilizes the same subnet mask 32 to determine whether another computing device is on the same subnet, or on a different network. The IP addresses 28, 30-1-30-N may be referred to as being "on" the local subnet 14. The local gateway router 24 also has an external IP address 34 that is not on the local subnet 14 and which may be used, for example, for network address translation after the local gateway router 24 automatically transitions from tunneling mode to routing mode, as will be described in greater detail below. The local gateway router 24 is configured to be able to provide to the computing devices 26-1-26-N, when in routing mode, default gateway router functions, such as, by way of non-limiting example, one or more of a NAT function 18-B, a DHCP function 20-B, and a DNS function 22-B.

The local gateway router 24 and the network gateway router 16 communicate with one another via a tunnel 36 that is implemented via a tunneling protocol. The tunneling protocol may comprise any suitable tunneling protocol; however, in some embodiments, the tunneling protocol comprises a layer 2 tunneling protocol such as, by way of non-limiting example, the generic routing encapsulation (GRE) tunneling protocol. The local gateway router 24 may maintain tunnel status information 38 that indicates whether or not the tunnel 36 is currently "up" or "down". The tunnel 36 is considered up when the network gateway router 16 is responsive to communications from the local gateway router 24, and is considered down when the network gateway router 16 is not responsive to communications from the local gateway router 24. The network gateway router 16 may become unresponsive for any number of reasons, such as a failure or fault of the network gateway router 16, or a fault in a physical communications link between the network gateway router 16 and the local gateway router 24.

The network gateway router 16 has an IP address 40 that is on the local subnet 14 and is the same as the IP address 28 of the local gateway router 24. The local gateway router 24 and the network gateway router 16 maintain track of their ability to communicate with one another. This may be implemented in any desired manner, such as polling one another periodically or aperiodically. In some embodiments, a protocol such as First Hop Redundancy Protocol (FHRP) may be implemented on the local gateway router 24 and the network gateway router 16 to facilitate automatic and substantially near-instantaneous notification of when the local gateway router 24 and the network gateway router 16 can no longer communicate with one another.

The network gateway router 16 also utilizes the same subnet mask 32 as the local gateway router 24 and the computing devices 26-1-26-N. The network gateway router 16 also has an external IP address 41 that is not on the local subnet 14 and which may be used, for example, for network address translation. The local gateway router 24, when in tunneling mode, forwards all packets on the local subnet 14 that have a destination address of the network gateway router 16, all broadcast packets, and packets that have a destination address off the local subnet 14, to the network gateway router 16 for the network gateway router 16 to provide a default network gateway function for the local subnet 14. To the computing devices 26-1-26-N, the network gateway router 16 is on the local subnet 14. In particular, the computing device 26-1, for example, may address a packet using a MAC address 42 (i.e., a layer 2 data link address) of the network gateway router 16 and transmit the packet on the local subnet 14. The local gateway router 24 determines that the packet has the MAC address 42 of the network gateway router 16, encapsulates the packet in accordance with the tunneling protocol, and forwards the encapsulated packet to the network gateway router 16. The network gateway router 16 may generate a response packet, address the response packet to a MAC address 44 of the computing device 26-1, encapsulate the response packet in accordance with the tunneling protocol, and send the encapsulated response packet to the local gateway router 24 via the tunnel 36. The local gateway router 24 receives the encapsulated response packet, extracts the response packet, and forwards the response packet to the computing device 26-1. Thus, each of the computing devices 26-1-26-N, the local gateway router 24 and the network gateway router 16 have layer 2 connectivity to one another and can communicate with one another utilizing layer 2 MAC addresses.

The tunnel 36 may traverse a communications path that includes one or more devices 46. In this example, the devices 46 include a cable modem 46-1, a cable modem termination system (CMTS) 46-2, and a distribution router (DTR) 46-3. In this particular implementation, the cable modem 46-1 is located in the same home or business facility as the local gateway router 24, and the CMTS 46-2 and DTR 46-3 are located in facilities operated by the respective service provider.

As an example of processing when the network gateway router 16 is operational and is serving as the default gateway router for the local subnet 14 and the local gateway router 24 is in tunneling mode, assume that the computing device 26-1 initiates connection with the local subnet 14. This initiation may comprise, for example, a user physically coupling the computing device 26-1 to a switch of the local subnet 14 via an Ethernet cable, or attempting to join a Wi-Fi® adapter of the local subnet 14 by entering an appropriate password. At the initial time of connection, the computing device 26-1 does not have an IP address on the local subnet 14. The computing device 26-1 sends out a DHCP broadcast query to obtain an IP address on the local subnet 14. The local gateway router 24 receives the DHCP broadcast query, and sends the DHCP broadcast query to the network gateway router 16 via the tunnel 36 (solely for purposes of brevity, the steps of encapsulation associated with use of the tunnel 36 will not always be discussed herein). The network gateway router 16 receives the DHCP broadcast query, and selects the IP address 30-1 from a pool of available IP addresses of the local subnet 14. The DHCP function 20 of the network gateway router 16 generates a response that includes the IP address 30-1, information identifying the network gateway router 16 as the default gateway router for the local subnet 14, and the subnet mask 32.

The local gateway router 24 receives the response, and sends the response to the computing device 26-1. The computing device 26-1 receives the response, and stores the IP address 30-1 and the subnet mask 32 of the network gateway router 16 as the default gateway router. The computing device 26-1 may then send an Address Resolution Protocol (ARP) request using the IP address 30-1 to obtain the MAC address 42 of the network gateway router 16.

This process may be repeated for each of the computing devices 26-2-26-N as the computing devices 26-2-26-N connect to the local subnet 14, such that each of the computing devices 26-2-26-N obtains a unique IP address on the local subnet 14, obtains the MAC address 42 of the network gateway router 16 as the default gateway router, and obtains the subnet mask 32.

Assume for purposes of additional illustration, the computing device 26-1 subsequently desires to send a packet to a computing device 48 in the Internet 50 that has an IP address of 42.566.123.1. The computing device 26-1 determines, using the subnet mask 32, that the IP address 42.566.123.1 is not on the local subnet 14, and thus must be forwarded by the network gateway router 16. The computing device 26-1 generates a packet 52 that includes a header identifying the destination MAC address 54 of the network gateway router 16, a destination IP address 56 of 42.566.123.1, and a source IP address 58 of the computing device 26-1, and transmits the packet onto the local subnet 14.

The local gateway router 24 determines, based on either the destination MAC address 54 or the destination IP address 56 that the packet 52 is destined for the network gateway router 16. The local gateway router 24 generates an encapsulated packet 60 that encapsulates the packet 52 in accordance with the tunneling protocol that implements the tunnel 36, and sends the encapsulated packet 60 to the network gateway router 16. The network gateway router 16 receives the encapsulated packet 60, extracts the packet 52 from the encapsulated packet 60, and determines that the packet 52 is destined for the computing device 48 that is off the local subnet 14. The NAT function 18 of the network gateway router 16 translates the source IP address 58 in the header to the external IP address 41 of the network gateway router 16, such that the source IP address of the packet 52 now indicates that the packet 52 originated from the network gateway router 16 rather than the computing device 26-1. The NAT function 18 maintains information suitable for correlating the packet 52 to the computing device 26-1 so that when a response is received by the network gateway router 16 from the computing device 48, the network gateway router 16 can determine that the response is destined for the computing device 26-1. The network gateway router 16 determines a next hop address of a next hop router in the path of routers between the network gateway router 16 and the computing device 48, addresses the packet 52 to the next hop router, and communicates the packet 52 to the next hop router.

Subsequently, the network gateway router 16 receives a response packet to the packet 52 from the computing device 48, determines that the response packet is destined for the computing device 26-1, alters the header of the response packet to have the MAC address of the computing device 26-1, and generates an encapsulated packet in accordance with the tunneling protocol that implements the tunnel 36. The local gateway router 24 receives the encapsulated packet, extracts the response packet from the encapsulated packet, and transmits the response packet on the local subnet 14 for delivery to the computing device 26-1.

Figure 2:
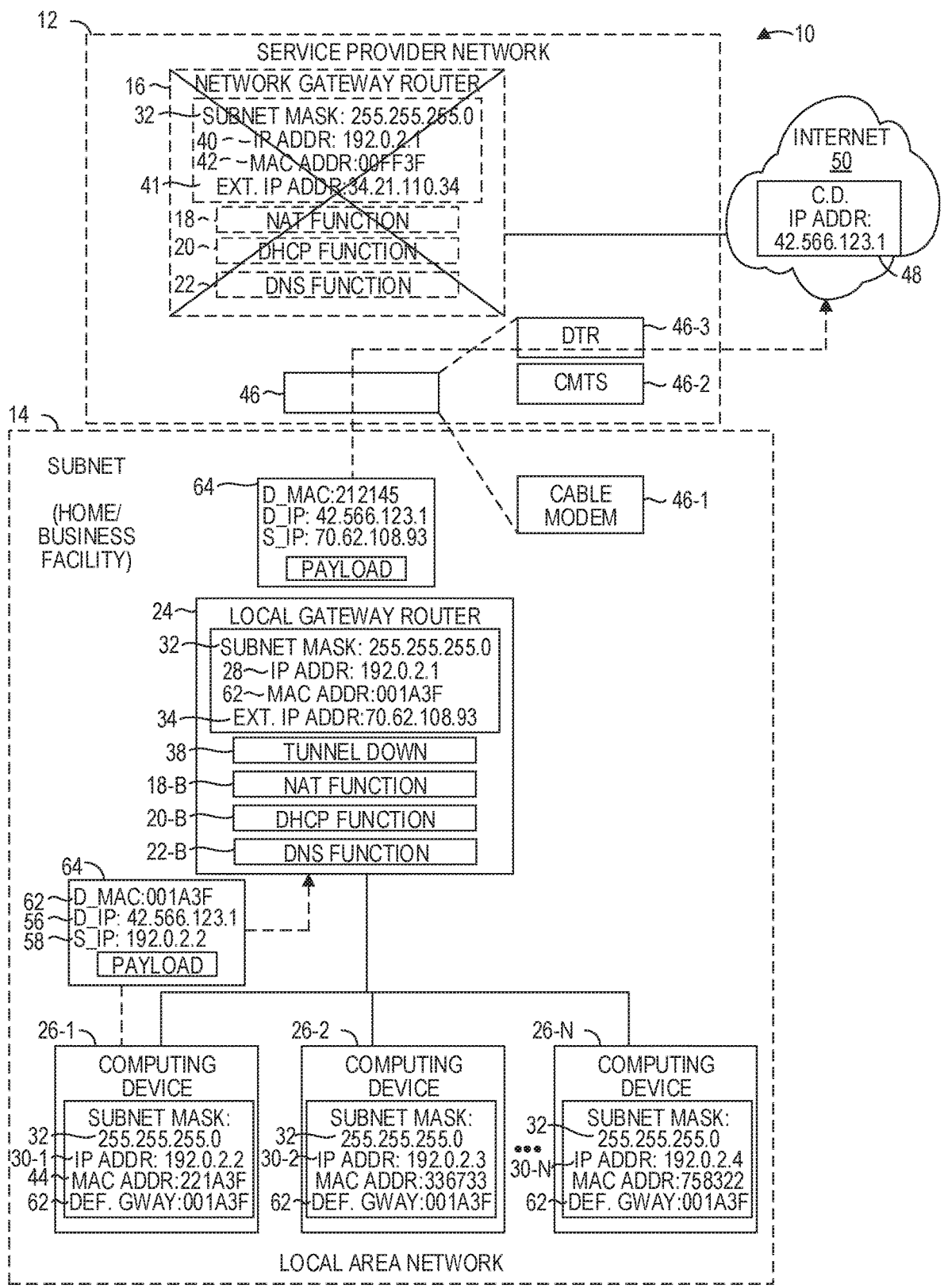
FIG. 2 is a block diagram illustrating the system shown in FIG. 1 at a point in time when the network gateway router has stopped responding.

FIG. 2 illustrates the system 10 at a point in time when the network gateway router 16 has stopped responding, as visually indicated by the crossed-out network gateway router 16 in FIG. 2. The network gateway router 16 may stop responding for any number of reasons, such as, by way of non-limiting examples, a fault or other problem with the network gateway router 16, a fault in a communications link, or the like. The local gateway router 24 determines that the network gateway router 16 has stopped responding, and automatically (i.e., without human involvement) transitions from the tunneling mode to the routing mode. The local gateway router 24 may detect that the network gateway router 16 has stopped responding in any number of ways. If the local gateway router 24 and the network gateway router 16 implement FHRP or a similar protocol, the local gateway router 24 will be notified when the network gateway router 16 is no longer responding. In other embodiments, the local gateway router 24 may periodically or aperiodically poll the network gateway router 16 to determine whether the network gateway router 16 is responding.

The local gateway router 24 sets the tunnel status information 38 to indicate that the tunnel 36 is down. The local gateway router 24 may send out a broadcast message, such as a gratuitous ARP message, or the like, to inform the computing devices 26-1-26-N that the local gateway router 24 is now the default gateway router for the local subnet 14. In other embodiments, the computing devices 26-1-26-N, after the ARP table entry for the default gateway router expires, may send an ARP request, at which time the local gateway router 24 now, rather than encapsulating and sending such ARP requests to the network gateway router 16, responds to such ARP requests, and identifies a MAC address 62 of the local gateway router 24 as the MAC address of the default gateway router for the local subnet 14. Each of the computing devices 26-1-26-N update the MAC address 42 (i.e., a layer 2 data link address) of the network gateway router 16 with the MAC address 62 of the local gateway router 24.

The local gateway router 24 subsequently provides, via, for example, the NAT function 18-B, the DHCP function 20-B, and the DNS function 22-B, default gateway router services to the local subnet 14 that were previously provided by the network gateway router 16. Thus, the local gateway router 24 now responds to DHCP broadcast queries, provides NAT services, and provides DNS services for translating a domain name to an IP address for the computing devices 26-1-26-N.

For purposes of illustration, assume that the computing device 26-1 desires to send a packet to the computing device 48 in the Internet 50. Utilizing the subnet mask 32, the computing device 26-1 determines that the computing device 48 is not on the local subnet 14, and thus that the packet must be routed by the default gateway router which is now the local gateway router 24. The computing device 26-1 generates a packet 64 that includes a header identifying the destination MAC address 62 of the local gateway router 24, the destination IP address 56 of 42.566.123.1, and source IP address 58 of the computing device 26-1, and transmits the packet onto the local subnet 14.

The local gateway router 24 receives the packet 64 and determines that the packet 64 is destined for the computing device 48. The NAT function 18-B of the local gateway router 24 translates the source IP address 58 in the header to the external IP address 34 of the local gateway router 24, such that the source IP address of the packet 64 now indicates that the packet 64 originated from the local gateway router 24 rather than the computing device 26-1. The NAT function 18-B maintains information suitable for correlating the packet 64 to the computing device 26-1 so that when a response is received by the local gateway router 24 from the computing device 48, the local gateway router 24 can determine that the response is destined for the computing device 26-1. The local gateway router 24 determines a next hop address of a next hop router in the path of routers between the local gateway router 24 and the computing device 48. In this example, the next hop router is the distribution router 46-3. The local gateway router 24 addresses the packet 64 to the distribution router 46-3, and communicates the packet 64 to the distribution router 46-3 for subsequent routing toward the computing device 48.

Subsequently, the local gateway router 24 receives a response packet to the packet 64 from the computing device 48, determines that the response packet is destined for the computing device 26-1, alters the header of the response packet to have the MAC address of the computing device 26-1, and transmits the response packet on the local subnet 14 for delivery to the computing device 26-1.

Figure 3:
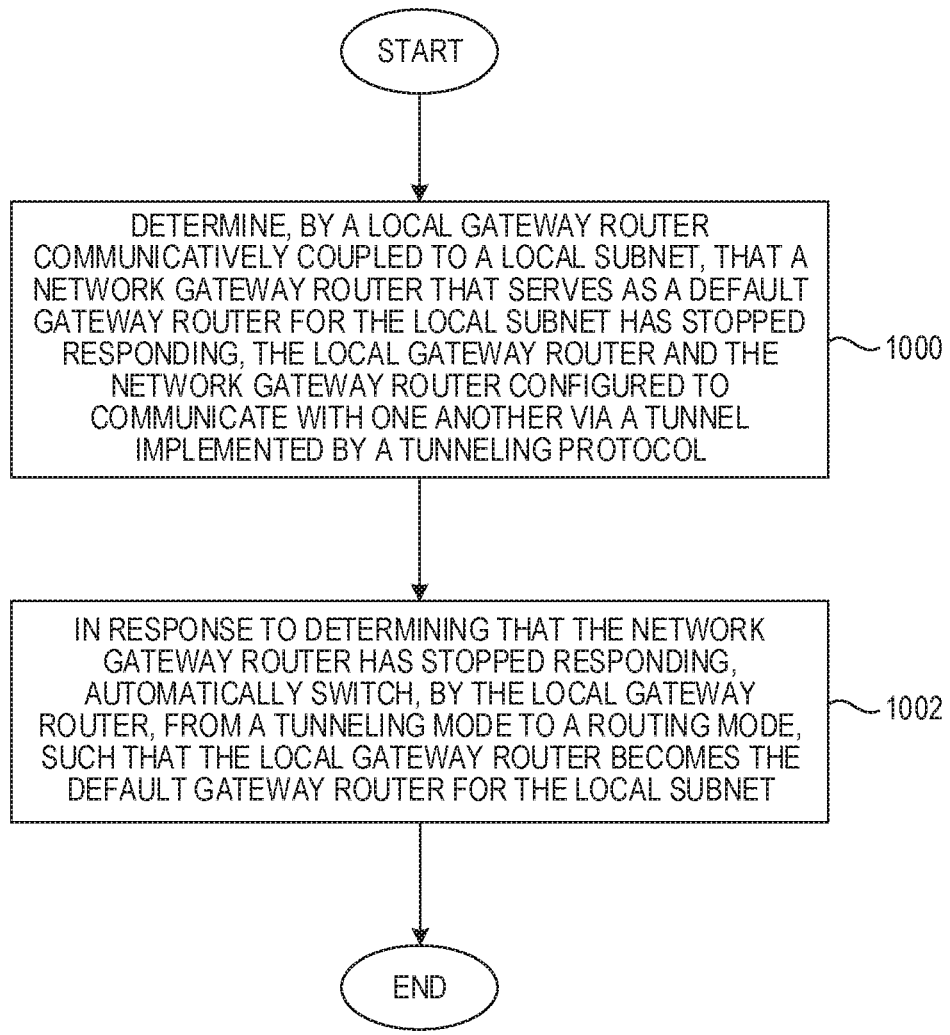
FIG. 3 is a flowchart of a method for facilitating a local gateway router backup of a network gateway router according to one embodiment.

FIG. 3 is a flowchart of a method for facilitating an automatic local gateway router backup of a network gateway router according to one embodiment. FIG. 3 will be discussed in conjunction with FIGS. 1 and 2. The local gateway router 24, communicatively coupled to the local subnet 14, determines that the network gateway router 16 that serves as the default gateway router for the local subnet 14 has stopped responding. The local gateway router 24 and the network gateway router 16 are configured to communicate with one another via the tunnel 36 implemented by the tunneling protocol (FIG. 3, block 1000). In response to determining that the network gateway router 16 has stopped responding, the local gateway router 24 automatically switches from the tunneling mode to the routing mode, such that the local gateway router 24 becomes the default gateway router for the local subnet 14 (FIG. 3, block 1002).

Figure 4:
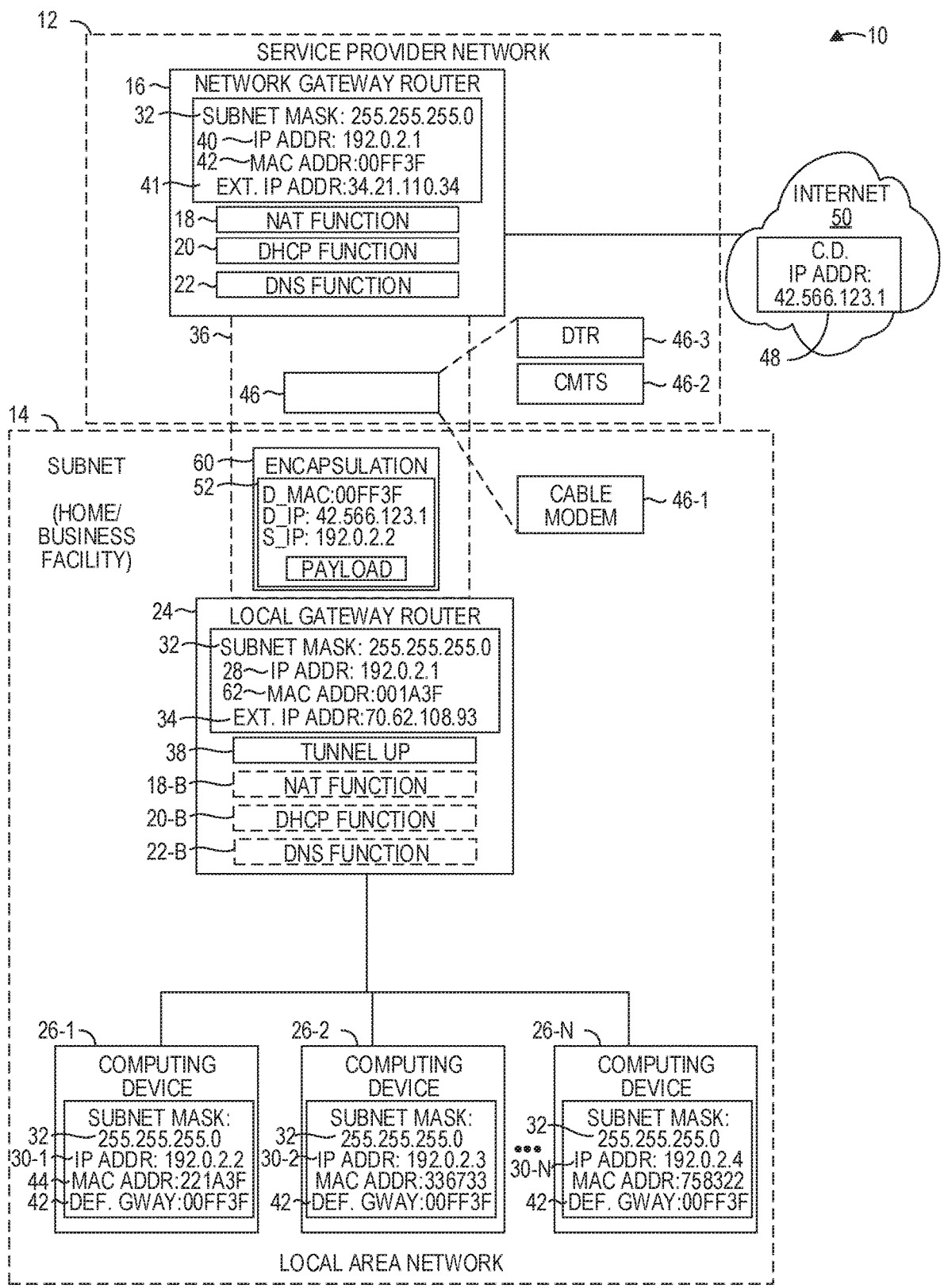
FIG. 4 is a block diagram illustrating the system shown in FIG. 1 at a point in time after the network gateway router has begun responding once again.

FIG. 4 illustrates the system 10 at a subsequent point in time to that illustrated in FIG. 3, after the network gateway router 16 has begun responding once again. In particular, at some point in time the network gateway router 16 sends a communication to the local gateway router 24 to re-establish communications with the local gateway router 24 and to obtain the role of the default gateway router once again. The local gateway router 24 and the network gateway router 16 re-establish the tunnel 36, and the local gateway router 24 sets the tunnel status information 38 to indicate that the tunnel 36 is up. The network gateway router 16 may utilize the tunnel 36 to send out a broadcast message, such as a gratuitous ARP, or the like, to inform the computing devices 26-1-26-N that the network gateway router 16 is now the default gateway router for the local subnet 14. In other embodiments, the computing devices 26-1-26-N, after the ARP table entry for the default gateway router expires, may send an ARP request. The network gateway router 16 now responds to such ARP requests instead of the local gateway router 24, and identifies the MAC address 42 of the network gateway router 16 as the MAC address of the default gateway router for the local subnet 14. Each of the computing devices 26-1-26-N update the MAC address 62 of the local gateway router 24 with the MAC address 42 of the network gateway router 16, and processing continues as described with regard to FIG. 1.

Figure 5:
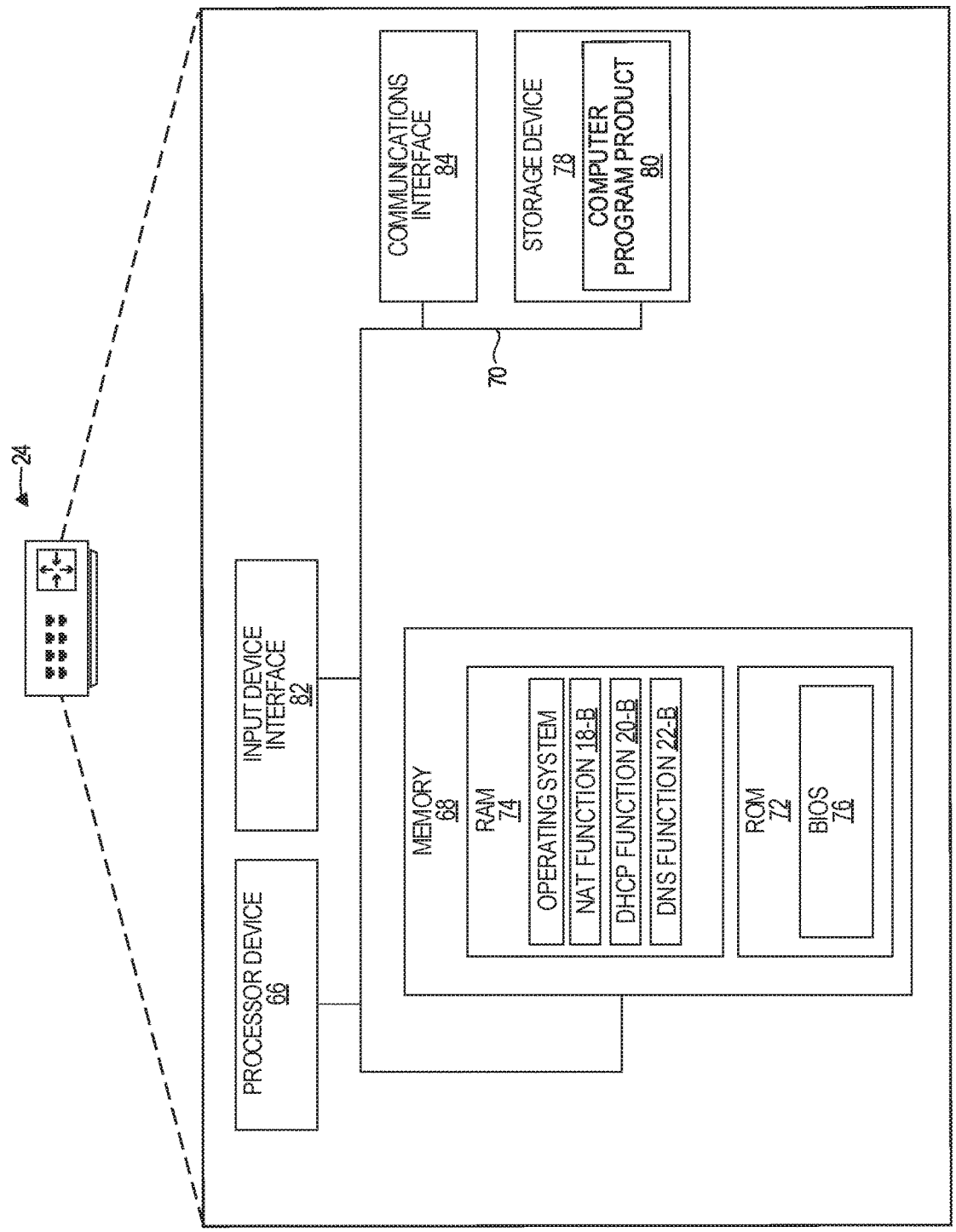
FIG. 5 is a block diagram of the local gateway router according to one embodiment.

FIG. 5 is a block diagram of the local gateway router 24 suitable for implementing examples according to one example. The local gateway router 24 may comprise any computing or electronic device capable of including firmware, hardware, and/or executing software instructions to implement the functionality described herein, such as a special purpose network router, or a computer comprising suitable communication interfaces and software to execute the functions described herein. The local gateway router 24 includes a processor device 66, a system memory 68, and a system bus 70. The system bus 70 provides an interface for system components including, but not limited to, the system memory 68 and the processor device 66. The processor device 66 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The system memory 68 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the local gateway router 24. The volatile memory 74 may also include a high-speed RAM, such as static RAM, for caching data.

The local gateway router 24 may further include or be coupled to a non-transitory computer-readable storage medium such as a storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like.

A number of modules can be stored in the storage device 78 and in the volatile memory 74, including an operating system and one or more program modules, such as the NAT function 18-B, the DHCP function 20-B and the DNS function 22-B, which may implement the functionality described herein in whole or in part.

All or a portion of the examples may be implemented as a computer program product 80 stored on a transitory or non-transitory computer-usable or computer-readable storage medium, such as the storage device 78, which includes complex programming instructions, such as complex computer-readable program code, to cause the processor device 66 to carry out the steps described herein. Thus, the computer-readable program code can comprise software instructions for implementing the functionality of the examples described herein when executed on the processor device 66.

An operator may also be able to enter one or more configuration commands through a keyboard (not illustrated), a pointing device such as a mouse (not illustrated), or a touch-sensitive surface such as a display device (not illustrated). Such input devices may be connected to the processor device 66 through an input device interface 82 that is coupled to the system bus 70 but can be connected by other interfaces such as a parallel port, an Institute of Electrical and Electronic Engineers (IEEE) 1394 serial port, a Universal Serial Bus (USB) port, an IR interface, and the like.

The local gateway router 24 also includes a communications interface 84 suitable for communicating with the computing devices 26-1-26-N and the cable modem 46-1. In some embodiments the communications interface 84 comprises a plurality of Ethernet ports and associated transceivers, and may also include a Wi-Fi® interface.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   prior to determining, by a local gateway router communicatively coupled to a local subnet, that a network gateway router that serves as a default gateway router for the local subnet has stopped responding, receiving, by the local gateway router, a dynamic host configuration protocol (DHCP) broadcast query from a first computing device on the local subnet, wherein the local gateway router and the network gateway router are configured to communicate with one another via a tunnel implemented by a tunneling protocol;
   sending, by the local gateway router via the tunnel, the DHCP broadcast query to the network gateway router;
   receiving, by the local gateway router from the network gateway router via the tunnel, a response to the DHCP broadcast query from the network gateway router destined for the first computing device;
   sending, by the local gateway router to the first computing device, the response;
   determining, by the local gateway router that the network gateway router has stopped responding; and
   in response to the determining that the network gateway router has stopped responding, automatically switching, by the local gateway router, from a tunneling mode to a routing mode, such that the local gateway router becomes the default gateway router for the local subnet.

2. The method of claim 1 wherein the determining that the network gateway router has stopped responding comprises using a first hop redundancy protocol to determine that the network gateway router has stopped responding.

3. The method of claim 1 wherein the tunneling protocol is a layer 2 tunneling protocol.

4. The method of claim 1 further comprising broadcasting, by the local gateway router on the local subnet, a message identifying the local gateway router as the default gateway router.

5. The method of claim 1 further comprising:
   prior to the determining that the network gateway router has stopped responding, receiving, by the local gateway router, a first packet from a computing device on the local subnet, the first packet containing a destination internet protocol (IP) address that is off the local subnet; and forwarding, via the tunnel, the first packet to the network gateway router for network address translation and routing of the first packet off the local subnet.

6. The method of claim 5 further comprising:
subsequent to the determining that the network gateway router has stopped responding, receiving, by the local gateway router, a second packet from a computing device on the local subnet, the second packet containing a destination IP address that is off the local subnet;
translating a source IP address of the computing device on the local subnet identified in the second packet to an external IP address of the local gateway router, the external IP address not being on the local subnet;
determining a next hop address associated with a next router in a path of routers between the local gateway router and a destination router that is on a same subnet as the destination IP address; and
sending the second packet to the next router via the next hop address.

7. The method of claim 1, further comprising storing information indicating that the tunnel is not operable in response to the determining that the network gateway router has stopped responding.

8. The method of claim 1 further comprising:
subsequent to the determining that the network gateway router has stopped responding, receiving, by the local gateway router, a DHCP broadcast query from a second computing device on the local subnet;
assigning, by the local gateway router, an IP address to the second computing device, the IP address being on the local subnet; and
sending, by the local gateway router, a response to the second computing device that contains the IP address.

9. The method of claim 1 wherein the tunneling protocol comprises a generic routing encapsulation (GRE) tunneling protocol.

10. A gateway router, comprising:
a memory;
a transceiver configured to be coupled to a local subnet; and
a processor device coupled to the memory, the processor device configured to:
prior to a determination that a network gateway router that serves as a default gateway router for the local subnet has stopped responding, receive a dynamic host configuration protocol (DHCP) broadcast query from a first computing device on the local subnet, wherein the gateway router and the network gateway router are configured to communicate with one another via a tunnel implemented by a tunneling protocol;
send, via the tunnel, the DHCP broadcast query to the network gateway router;
receive, from the network gateway router via the tunnel, a response to the DHCP broadcast query from the network gateway router destined for the first computing device;
send, to the first computing device, the response;
determine that the network gateway router has stopped responding; and
in response to determining that the network gateway router has stopped responding, automatically switching, by the local gateway router, from a tunneling mode to a routing mode, such that the local gateway router becomes the default gateway router for the local subnet.

11. The gateway router of claim 10 wherein the tunneling protocol is a layer 2 tunneling protocol.

12. The gateway router of claim 10 wherein the processor device is further configured to:
prior to the determination that the network gateway router has stopped responding, receive a first packet from a computing device on the local subnet, the first packet containing a destination internet protocol (IP) address that is off the local subnet; and
forward, via the tunnel, the first packet to the network gateway router for network address translation and routing of the first packet off the local subnet.

13. The gateway router of claim 12 wherein the processor device is further configured to:
subsequent to the determination that the network gateway router has stopped responding, receive a second packet from a computing device on the local subnet, the second packet containing a destination IP address that is off the local subnet;
translate a source IP address of the computing device on the local subnet identified in the second packet to an external IP address of the local gateway router, the external IP address not being on the local subnet;
determine a next hop address associated with a next router in a path of routers between the local gateway router and a destination router that is on a same subnet as the destination IP address; and
send the second packet to the next router via the next hop address.

14. The gateway router of claim 10, wherein the processor device is further configured to store information indicating that the tunnel is not operable in response to the determination that the network gateway router has stopped responding.

15. A method comprising:
prior to determining, by a local gateway router communicatively coupled to a local subnet, that a network gateway router that serves as a default gateway router for the local subnet has stopped responding, receiving, by the local gateway router, a first packet from a computing device on the local subnet, the first packet containing a destination internet protocol (IP) address that is off the local subnet, wherein the local gateway router and the network gateway router are configured to communicate with one another via a tunnel implemented by a tunneling protocol;
forwarding, via the tunnel, the first packet to the network gateway router for network address translation and routing of the first packet off the local subnet;
determining, by the local gateway router, that the network gateway router has stopped responding;
in response to the determining that the network gateway router has stopped responding, automatically switching, by the local gateway router, from a tunneling mode to a routing mode, such that the local gateway router becomes the default gateway router for the local subnet;
subsequent to the determining that the network gateway router has stopped responding, receiving, by the local gateway router, a second packet from a computing device on the local subnet, the second packet containing a destination IP address that is off the local subnet;
translating a source IP address of the computing device on the local subnet identified in the second packet to an external IP address of the local gateway router, the external IP address not being on the local subnet;

determining a next hop address associated with a next router in a path of routers between the local gateway router and a destination router that is on a same subnet as the destination IP address; and sending the second packet to the next router via the next hop address.

16. A gateway router, comprising:

a memory;

a transceiver configured to be coupled to a local subnet; and a processor device coupled to the memory, the processor device configured to:

prior to a determination that a network gateway router that serves as a default gateway router for the local subnet has stopped responding, receive a first packet from a computing device on the local subnet, the first packet containing a destination internet protocol (IP) address that is off the local subnet, wherein the gateway router and the network gateway router are configured to communicate with one another via a tunnel implemented by a tunneling protocol;

forward, via the tunnel, the first packet to the network gateway router for network address translation and routing of the first packet off the local subnet;

determine that the network gateway router has stopped responding;

in response to the determination that the network gateway router has stopped responding, automatically switch from a tunneling mode to a routing mode, such that the gateway router becomes the default gateway router for the local subnet;

subsequent to the determination that the network gateway router has stopped responding, receive a second packet from a computing device on the local subnet, the second packet containing a destination IP address that is off the local subnet;

translate a source IP address of the computing device on the local subnet identified in the second packet to an external IP address of the gateway router, the external IP address not being on the local subnet;

determine a next hop address associated with a next router in a path of routers between the gateway router and a destination router that is on a same subnet as the destination IP address; and send the second packet to the next router via the next hop address.

* * * * *